US008625153B2

(12) United States Patent
Tseng et al.

(10) Patent No.: US 8,625,153 B2
(45) Date of Patent: Jan. 7, 2014

(54) MULTI-DIMENSIONAL DATA REGISTRATION INTEGRATED CIRCUIT FOR DRIVING ARRAY-ARRANGEMENT DEVICES

(75) Inventors: Fan Gang Tseng, Hsinchu (TW); Jian Chiun Liou, Kaohsiung County (TW)

(73) Assignee: National Tsing Hua University, Hsinchu (TW)

( * ) Notice: Subject to any disclaimer, the term of this patent is extended or adjusted under 35 U.S.C. 154(b) by 1248 days.

(21) Appl. No.: 12/480,332

(22) Filed: Jun. 8, 2009

(65) Prior Publication Data

US 2009/0316195 A1 Dec. 24, 2009

(30) Foreign Application Priority Data

Jun. 20, 2008 (TW) ................................ 97123013 A

(51) Int. Cl.
*G06K 15/10* (2006.01)

(52) U.S. Cl.
USPC ................. 358/1.8; 358/1.1; 347/58; 347/59; 347/48; 347/20; 347/61; 347/63; 385/16; 385/17; 385/18; 385/19; 385/24; 385/31

(58) Field of Classification Search
None
See application file for complete search history.

(56) References Cited

U.S. PATENT DOCUMENTS 6,603,899 B1 * 8/2003 Popp et al. ...................... 385/31
7,441,851 B2 * 10/2008 Liou et al. ....................... 347/12

OTHER PUBLICATIONS

Jian-Chiun Liou and Fan-Gang Tseng, An Intelligent High-speed 3D Data Registration Integrated Circuit applied to Large Array Format Inkjet Printhead, published in the Proceedings of the 1st IEEE International Conference on Nano/Micro Engineered and Molecular Systems, Jan. 2006.*

Jian-Chiun Liou and Fan-Gang Tseng, MEMS Inst., Nat. Tsing Hua Univ., Hsinchu, "An Intelligent High-Speed 3D Data Registration Integrated Circuit Applied to Large Array Format Inkjet Printhead," Nano/Micro Engineered and Molecular Systems, 2006. NEMS '06. 1st IEEE International Conference on Jan. 18-21, 2006. (pp. 368-372.).

* cited by examiner

*Primary Examiner* — Paul F Payer
(74) *Attorney, Agent, or Firm* — WPAT, P.C.; Anthony King; Kay Yang

(57) ABSTRACT

A multi-dimensional data registration integrated circuit is configured for driving array-arrangement devices. The array-arrangement devices comprise a plurality of first hierarchy sets, each which comprises a plurality of second hierarchy sets. The multi-dimensional data registration integrated circuit comprises a first hierarchy address selection circuit, a second hierarchy address selection circuit and a data supply circuit. The first hierarchy address selection circuit scans the first hierarchy sets, and selects a unit of the first hierarchy sets to activate it. The second hierarchy address selection circuit scans the second hierarchy sets. The data supply circuit writes a plurality of data into each designated unit of the second hierarchy sets according to the scanning sequence of the second hierarchy address selection circuit.

10 Claims, 8 Drawing Sheets

MULTI-DIMENSIONAL DATA REGISTRATION INTEGRATED CIRCUIT FOR DRIVING ARRAY-ARRANGEMENT DEVICES

BACKGROUND OF THE INVENTION (A) Field of the Invention

The present invention relates to a multi-dimensional data registration integrated circuit for driving array-arrangement devices, and more particularly, to a multi-dimensional integration and multi-task chip for driving a large microelectronic array system.

(B) Description of the Related Art

FIG. 1 is a schematic diagram of a traditional two-dimensional address selection circuit for driving 25 nozzles of a printhead. A two-dimensional address selection circuit 10 comprises a plurality of address selection lines A1-A5 and a plurality of data lines D1-D5. A plurality of array-arrangement control units 11 are at the intersections of the plurality of address selection lines A1-A5 and the plurality of data lines D1-D5. Each of the control units 11 comprises a transistor 111 and a resistor 112 for controlling a corresponding nozzle (not shown) to shoot a micro-scale ink droplet. When a transistor 111 is turned on by its connected address selection line, the data line connected to the transistor 111 supplies the resistor 112 connected to the transistor 111 with a pulse voltage. A bubble is generated through the pulse voltage, and a microdroplet is forced out of a corresponding nozzle by the bubble. G1-G5 in this figure represent ground terminals.

The printing technology of inkjet printers is continuously improving, because the requirements for high printing quality and resolution continue to increase. As ink droplet sizes are reduced, higher printing resolution of inkjet printers becomes feasible. However, the printing speed is reduced if only the resolution is improved. Most current inkjet printheads utilize the two-dimensional address selection circuit in FIG. 1 to directly drive their nozzle arrays to shoot micro ink droplets. When higher printing speed and greater resolution is needed, the driving time should be reduced and more nozzles have to be simultaneously controlled. Unfortunately, the aforesaid two-dimensional driving circuit or one-dimensional driving circuit limits the printing speed and allowable printhead number. For simultaneously improving both printing speed and resolution, more nozzles have to be provided on a single printhead chip. However, it appears that the two-dimensional driving circuit or one-dimensional driving circuit cannot satisfy such requirements.

The aforesaid technology can also be applied to drive array-arrangement thermal-optical switches, and the thermal-optical switches can control resistors to generate heat through direct current in current development. When the current passes the resistor-type heater ring, the metal film of the ring becomes hot, and the heat distribution of the branches of the waveguide changes. Accordingly, the refraction indexes of the waveguide under the heater ring change. Therefore, the optical couple can be direct from the main of the waveguide to the destination branch of the waveguide, hence the optical switches can be specified to open or close. However, such a system of thermal-optical switches cannot satisfy the requirements for large amounts of data to be transmitted, stored, exchanged and processed at high speed. Because the number of the thermal-optical switches is great, driving the resistors through direct current causes low reliability, low switch speed and temperature instability of the resistors.

Furthermore, many additional external pads are needed when the number of the thermal-optical switches arranged in an array is increased. Consequentially, the cost and failure rate of the package are increased. For example, an array comprising 300 thermal-optical switches needs 302 external pads. It is necessary for each of these external pads to have a good electrical connection with an external driving circuit board. However, if any of the external pads does not have a good electrical connection, the corresponding thermal-optical switches will fail to normally operate so that the designated paths of the waveguide cannot be heated. That is, the optical coupling effects cannot be passed from the main of the waveguide to the branch of the waveguide. If the number of external pads can be reduced and the same number of the thermal-optical switches still can be controlled, the aforesaid problems can be resolved.

SUMMARY OF THE INVENTION

The present invention provides a multi-dimensional data registration integrated circuit for driving array-arrangement devices. It utilizes multi-dimensional or multi-hieratical circuit configuration to reduce the number of external terminals. Data is separately and sequentially output in a multiplex manner so that a large number of microelectronic devices arranged in an array can be controlled. Such an array is applicable to array-arrangement thermal-optical switches or a nozzle array device on an inkjet chip.

The present invention provides a multi-dimensional data registration integrated circuit capable of selecting processing signals. The data processing is performed in a manner whereby data is selected according to priority. The efficiency of the data registration of such a microelectronic device array is thereby improved.

The present invention provides a multi-dimensional data registration integrated circuit for driving array-arrangement devices. The array-arrangement devices comprise a plurality of first hierarchy sets, each of which comprises a plurality of second hierarchy sets. The multi-dimensional data registration integrated circuit comprises a first hierarchy address selection circuit, a second hierarchy address selection circuit and a data supply circuit. The first hierarchy address selection circuit scans the first hierarchy sets, and selects a unit of the first hierarchy sets to activate it. The second hierarchy address selection circuit scans the second hierarchy sets. The data supply circuit writes a plurality of data into each designated unit of the second hierarchy sets according to the scanning sequence of the second hierarchy address selection circuit.

Each unit of the second hierarchy sets is further divided into a plurality of third hierarchy sets. The multi-dimensional data registration integrated circuit further comprises a third hierarchy address selection circuit. The third hierarchy address selection circuit scans the third hierarchy sets.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

The following will demonstrate the present invention using the accompanying drawings to clearly present the characteristics of the technology.

Figure 1:
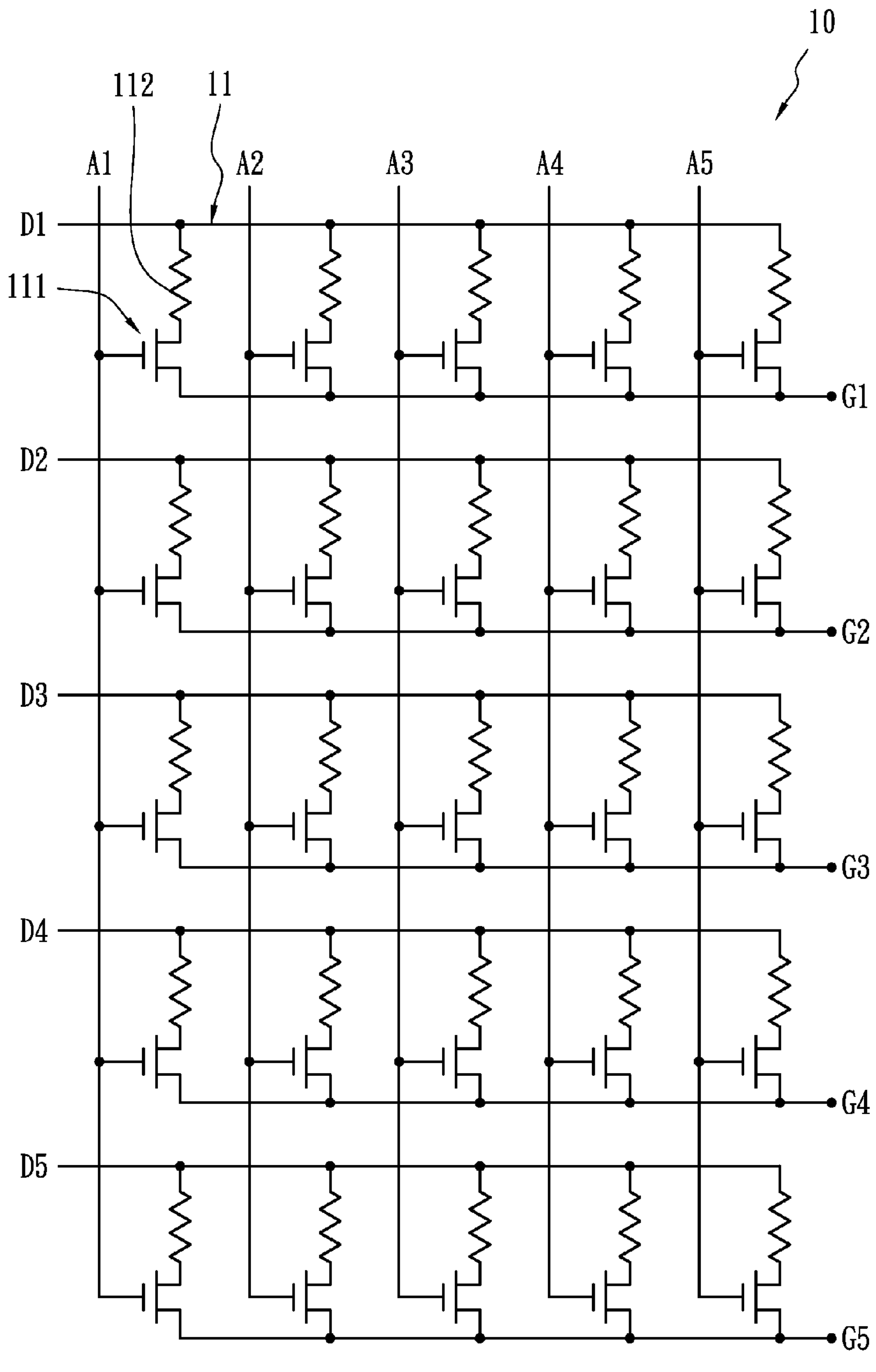
FIG. 1 (Prior Art)
FIG. 1 is a schematic diagram of a traditional two-dimensional address selection circuit for driving 25 nozzles of a printhead.
Figure 2A:
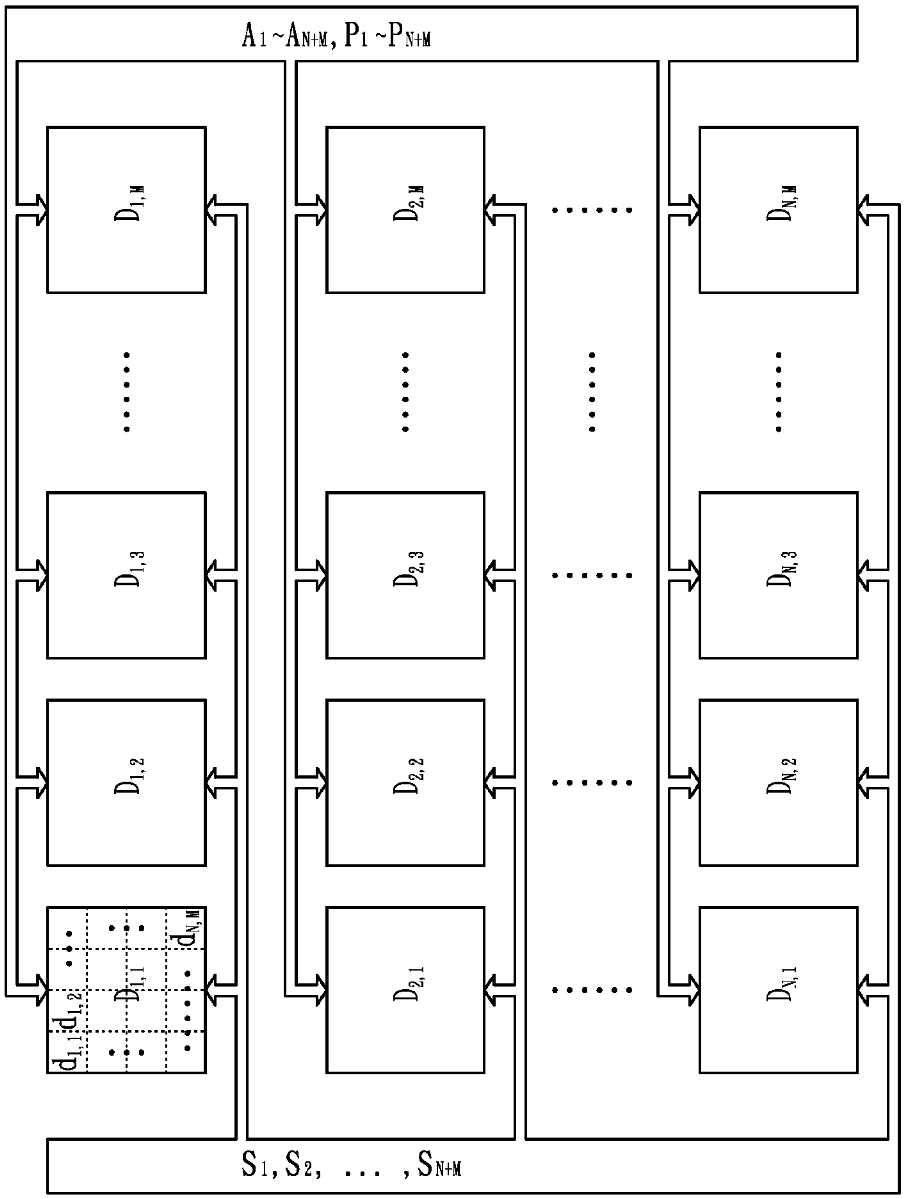
FIG. 2A is a schematic diagram of a multi-dimensional data registration integrated circuit for driving array-arrangement devices in accordance with the present invention.

FIG. 2A is a schematic diagram of a multi-dimensional data registration integrated circuit for driving array-arrangement devices in accordance with the present invention. In this figure, $D_{1,1}$, $D_{1,2}$, . . . , $D_{N,M}$ represent a plurality of first hierarchy sets in which a plurality of array-arrangement devices are divided. Each of the first hierarchy sets comprises partial array-arrangement devices to be driven. Referring to numeral references 111 and 112 in FIG. 1, each device can be an assembly of switches such as a transistor and a resistor. In addition to the previous assembly, an alternative assembly comprises a resistor and a thermal-optical switch. $S_1$, $S_2$, . . ., $S_{N+M}$ represent first hierarchy address selection signals, which can scan and select the plurality of first hierarchy sets $D_{1,1}$, $D_{1,2}$, . . ., $D_{N,M}$ to be activated. $A_1$, $A_2$, . . . , $A_{N+M}$ represent second hierarchy address selection signals, which can scan and select the second hierarchy sets $d_{1,1}$, $d_{1,2}$, . . . , $d_{N,M}$ of the activated first hierarchy set. Each of the second hierarchy sets comprises fewer partial array-arrangement devices, which can also be the devices located in one row or one column. When one of the second hierarchy sets is selected by the second hierarchy address selection signal to be activated, data signals $P_1$, $P_2$, . . . , $P_{N+M}$ are written into the corresponding devices of the activated second hierarchy set.

Similarly, the second hierarchy set can be further divided into a plurality of third hierarchy sets. Each of the third hierarchy sets comprises partial array-arrangement devices, which can also be the devices located in one row or one column. In this embodiment, a set of third hierarchy address selection signals is needed. One of the third hierarchy sets is selected by the third hierarchy address selection signal to be activated, and data signals $P_1$, $P_2$, . . . , $P_{N+M}$ are written into the corresponding devices of the activated third hierarchy set.

Figure 2B:
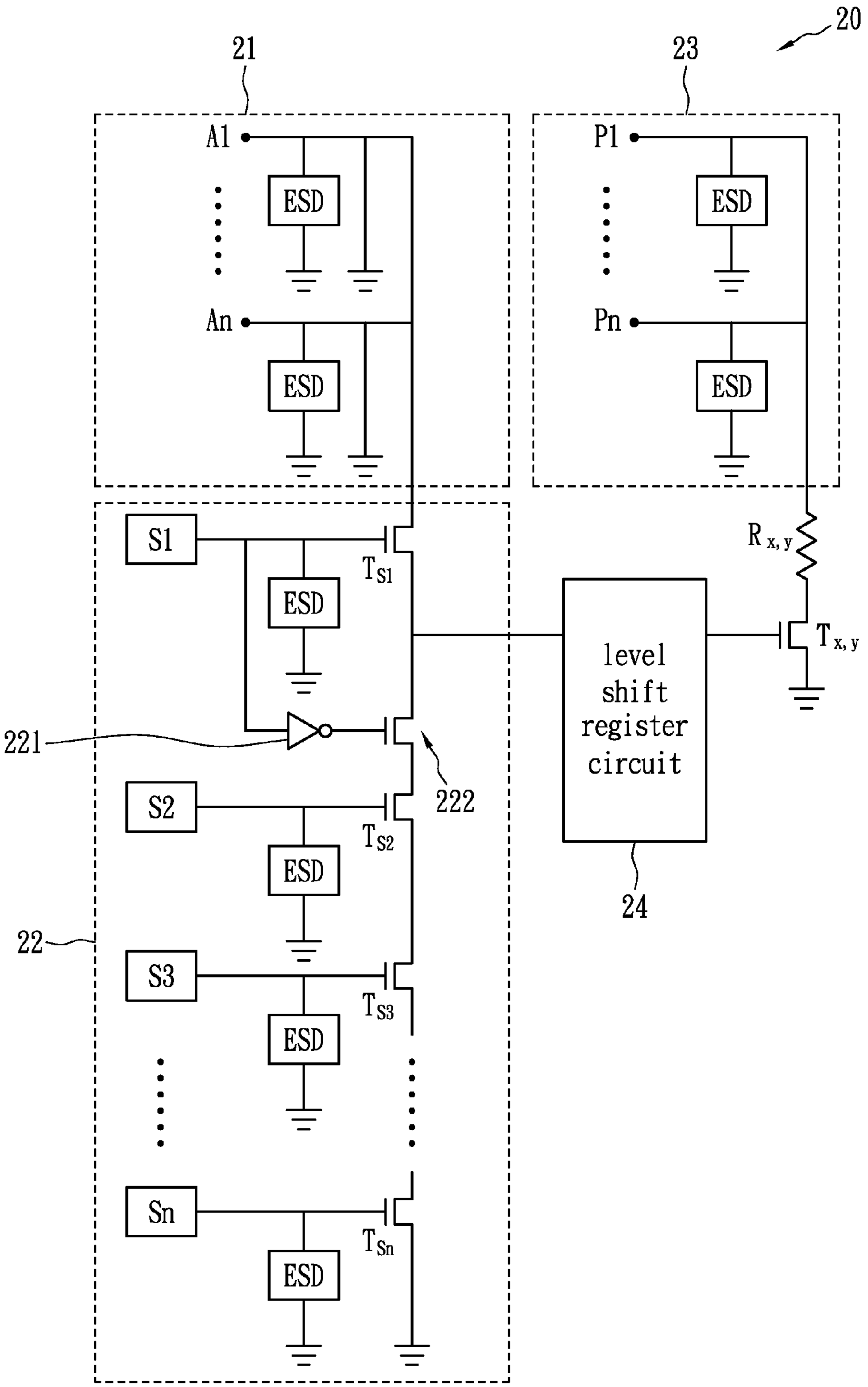
FIG. 2B is a configuration diagram of a multi-dimensional data registration integrated circuit in accordance with the present invention.

FIG. 2B is a configuration diagram of a multi-dimensional data registration integrated circuit in accordance with the present invention. A multi-dimensional data registration integrated circuit 20 comprises a first hierarchy address selection circuit 22, a second hierarchy address selection circuit 21, a data supply circuit 23, and a level shift register circuit 24. The first hierarchy address selection circuit 22 generates the first hierarchy address selection signals $S_1$, $S_2$, . . . , $S_{N+M}$, the second hierarchy address selection circuit 21 generates the second hierarchy address selection signals $A_1$, $A_2$, . . . , $A_{N+M}$, and the data supply circuit 23 generates the data signals $P_1$, $P_2$, . . . , $P_{N+M}$.

If a resistor $R_{x,y}$ is designated to generate heat, the corresponding first hierarchy address selection signal, second hierarchy address selection signal and data signal are simultaneously at a high level or an active level. For example, when the designated resistor $R_{x,y}$ is $R_{1,1}$, the signals $S_1$, $A_1$, and $P_1$ are at the active level. The signal $S_1$ turns on the transistor $T_{s1}$, and simultaneously a transistor 222 is turned off by an inverter 221. When the transistor 222 is inactive, the second hierarchy address selection signal cannot pass transistors $T_{s2}$, $T_{s3}$, . . . , $T_{sn}$ even if they are turned on by the first hierarchy address selection signal. Instead, the second hierarchy address selection signals $A_1$, $A_2$, . . . , $A_{N+M}$ are input into the level shift register circuit 24 through the transistor $T_{s1}$, and the level shift register circuit 24 sequentially outputs and scans the second hierarchy sets $d_{1,1}$, $d_{1,2}$, . . . , $d_{N,M}$ of the first hierarchy set $D_{1,1}$, arranged in an array. Because the signals $S_1$, $A_1$, and $P_1$ are simultaneously at an active level and the transistor $T_{s1}$ is opened, the resistor $R_{1,1}$, through which the circuit of the signal $P_1$ passes, generates heat.

The present invention proposes an aspect of multi-dimensional data registration to reduce the number of external terminals. Data are separately and sequentially output in a multiplex manner, and a large number of microelectronic devices arranged in an array are controlled. Furthermore, asymmetric MOS (Metal Oxidation Semiconductor) devices and CMOS (Complementary Metal Oxidation Semiconductor) devices are employed, and the corresponding process technology is also introduced in fabricating such a novel circuit. The present invention utilizes asymmetric MOSFET (Metal Oxidation Semiconductor Field Emitting Transistor) devices or CMOSFET devices, and integrates such devices to form a logic sequential multi-task control circuit for address selection applied to a thermal-optical switch array device or the nozzle array of a printhead chip.

The present invention provides a multi-dimensional data registration integrated circuit for driving array-arrangement devices. The invention utilizes multi-dimensional decoding to reduce the required number of external terminals. For example, N is designated as the number of external terminals, and Y is the number of nozzles; if the multi-dimensional data registration is employed, the number of external terminals is expressed as $N=3\times\sqrt{Y}+1$. As to the conventional two-dimensional data registration circuit, the number of external terminals is expressed as $N=3\times\sqrt{Y}+1$. The present invention can not only reduce the number of external terminals but also simplify the corresponding driving circuit. Therefore, the manufacturing cost is reduced. The following table shows the relation between the number of external terminals and the number of nozzles. If a conventional 600 dpi inkjet printhead has 1024 nozzles, at least 65 external terminals are needed using the prior art. By contrast, using the method according to the present invention, only 31 external terminals are needed. Compared to the prior art, the present invention can control a greater number of nozzles with the same number of external terminals so as to have the advantages of high resolution and fast printing speed.

TABLE 1

| | Circuit configuration | | |
|---|---|---|---|
| | One D | Two D | Three D |
| Number of nozzles Y | 1000 | 1024 | 1000 |
| Number of thermal resistors | 1000 | 1024 | 1000 |
| Resolution (dpi) | 300 | 300-600 | Above 600 |
| Number of external terminals N | N = Y + 11001 | $N = 2\times\sqrt[2]{Y} + 165$ | $N = 3\times\sqrt[3]{Y} + 131$ |

In view of the above table, when the number of the nozzles is greater than 27, the three dimensional circuit configuration is superior to the conventional two dimensional circuit configuration. Furthermore, the number of first hierarchy address selection signals should be larger than four when the number of nozzles of a printhead chip is greater than four.

Figure 3:
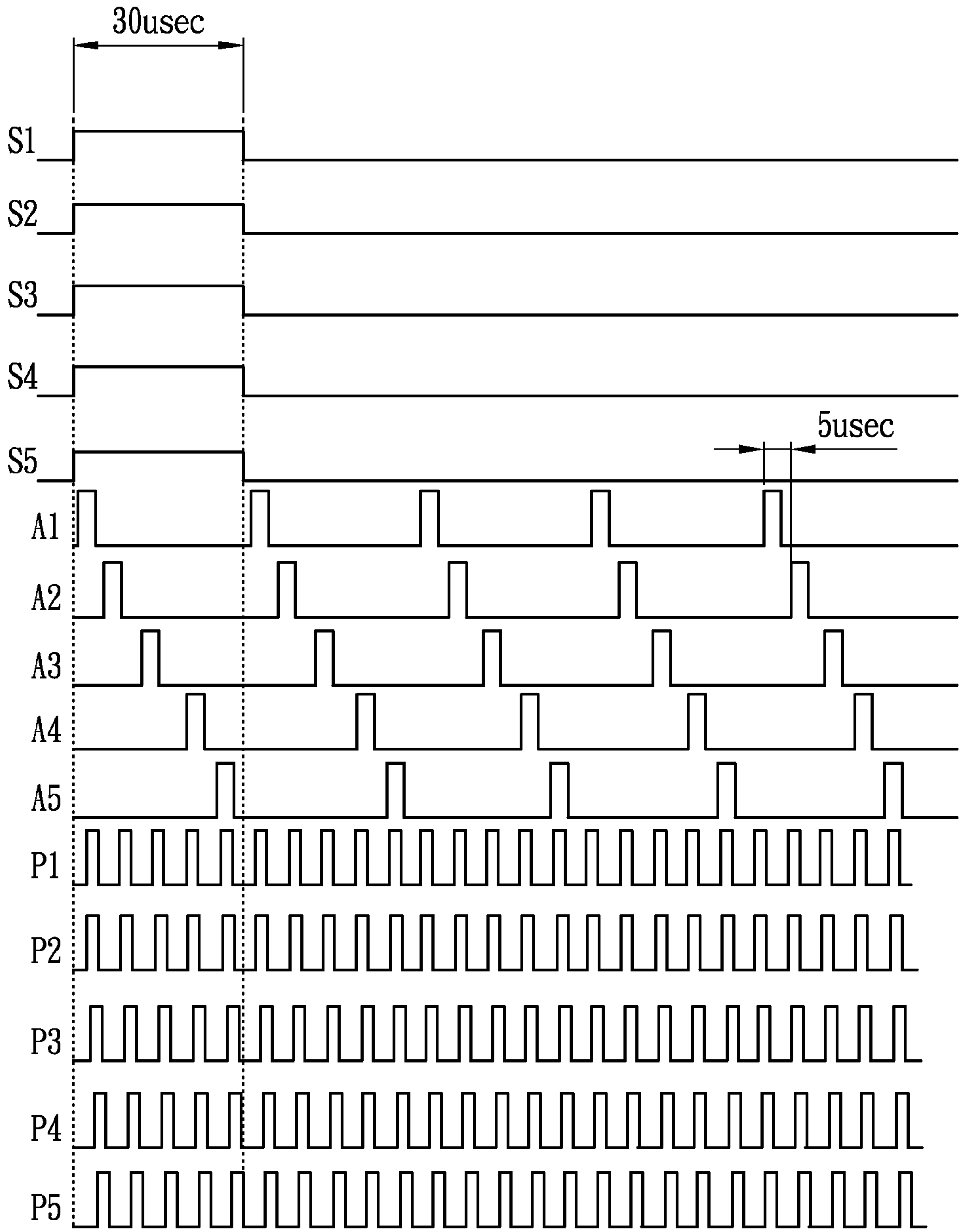
FIG. 3 is a waveform diagram of signals generated by a multi-dimensional data registration integrated circuit in accordance with the present invention.

FIG. 3 is a waveform diagram of signals generated by a multi-dimensional data registration integrated circuit in accordance with the present invention. When the first hierarchy address selection signals $S_1, S_2, \ldots, S_5$ are simultaneously at a high level or an active level and the transistors $T_{s2}, T_{s2}, \ldots, T_{s5}$ are activated by the signals $S_2, \ldots, S_5$, the inverter 221 and transistor 222 prevent the second hierarchy address selection signals from passing through these transistors. The pulses of the second hierarchy address selection signals $A_1, A_2, \ldots, A_5$ sequentially occur when the first hierarchy address selection signal $S_1$ activates the transistor $T_{s1}$. The pulses of the data signals $P_1, P_2, \ldots, P_5$ occur simultaneously with the pulses of the second hierarchy address selection signals $A_1, A_2, \ldots, A_5$.

Figure 4A:
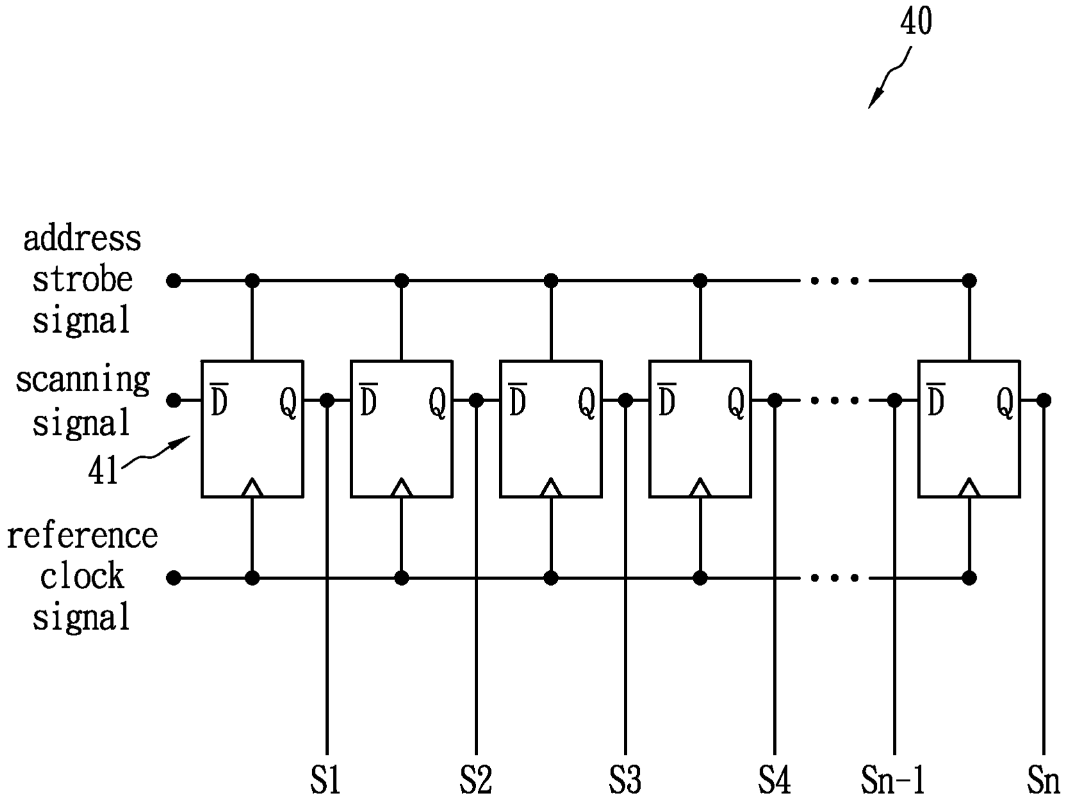
FIG. 4A is a configuration diagram of a level shift register in accordance with the present invention.

FIG. 4A is a configuration diagram of a level shift register in accordance with the present invention. A level shift register circuit 40 comprises a plurality of registers 41 connected in series. Through the triggers of the address strobe signals and the cycles of a reference clock signal, the level shift register circuit 40 acts as a serial-in parallel-out circuit.

Figure 4B:
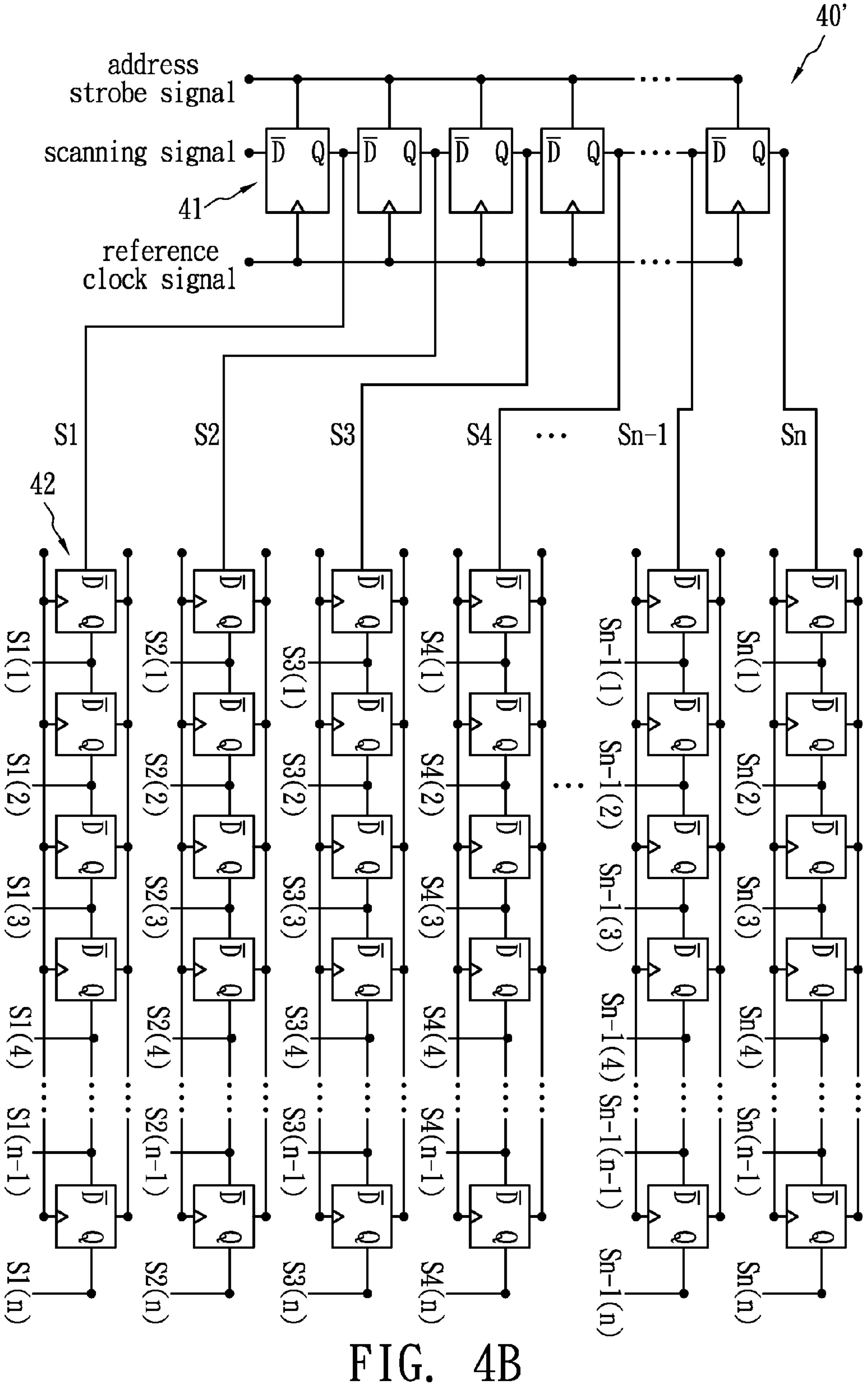
FIG. 4B is a configuration diagram of a level shift register in accordance with another embodiment of the present invention.

Each of the second hierarchy sets $d_{1,1}, d_{1,2}, \ldots, d_{N,M}$ is further divided into a plurality of third hierarchy sets. Accordingly, third hierarchy address selection signals S1(1), S1(2), . . . , Sn(1), . . . , Sn(n) are needed, as shown in FIG. 2A. FIG. 4B is a configuration diagram of a level shift register in accordance with another embodiment of the present invention. The numeral reference 42 in FIG. 4B is a register.

Figure 5A:
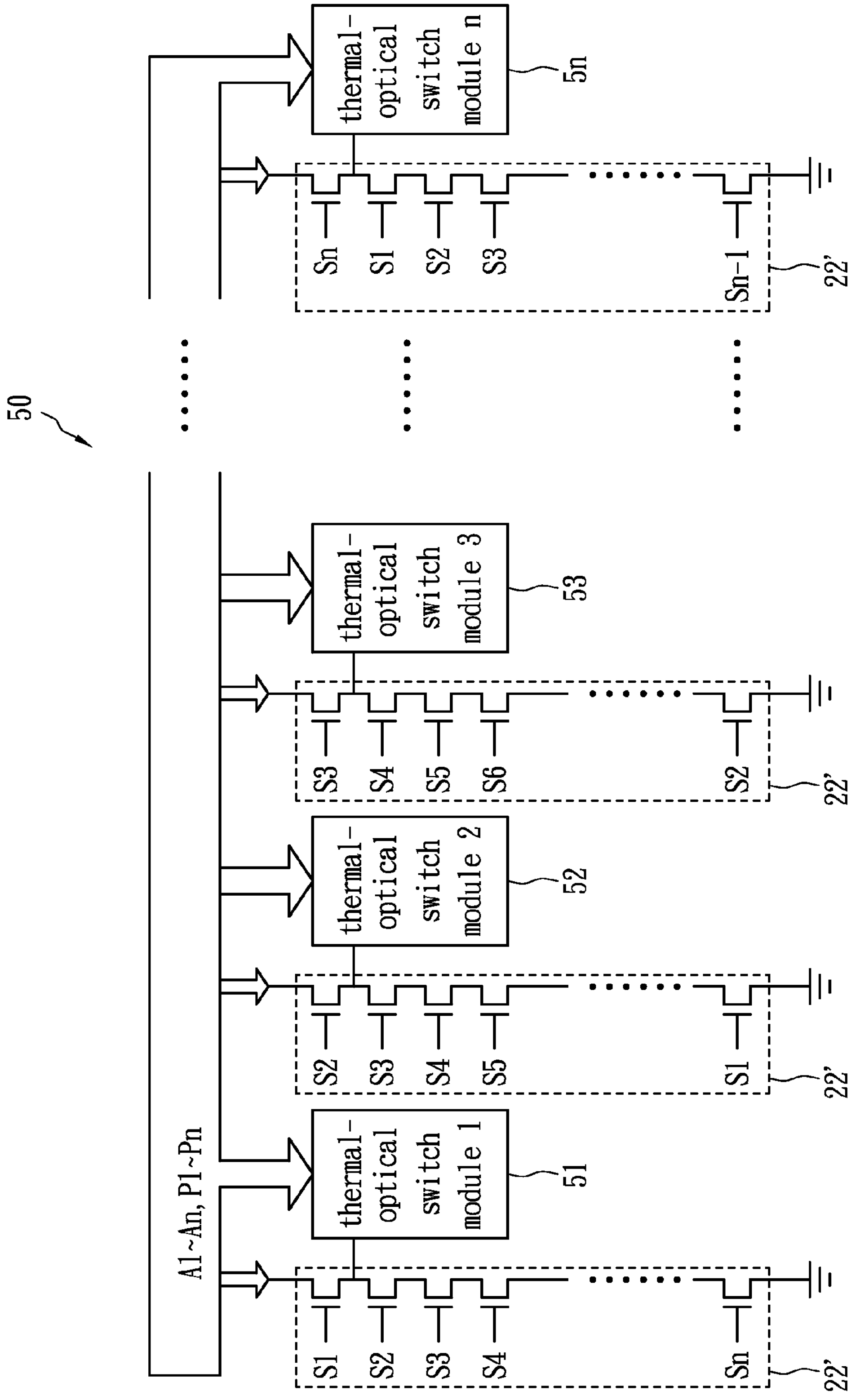
FIG. 5A is a schematic diagram of a multi-dimensional data registration integrated circuit for driving a thermal-optical switch module in accordance with the present invention.
Figure 5B:
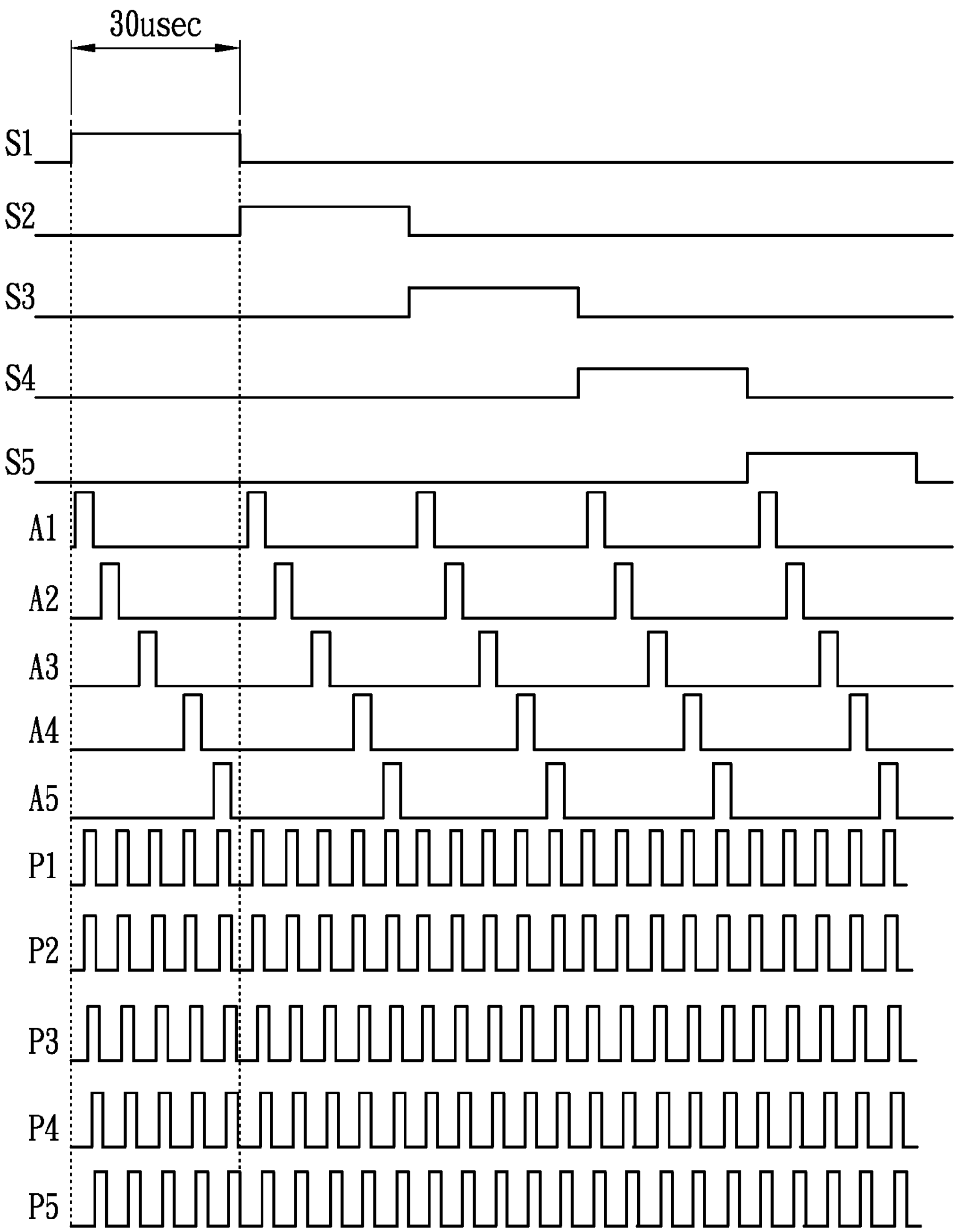
FIG. 5B is a waveform diagram of signals generated by the multi-dimensional data registration integrated circuit in FIG. 5A.

FIG. 5A is a schematic diagram of a multi-dimensional data registration integrated circuit for driving a thermal-optical switch module in accordance with the present invention. A plurality of thermal-optical switch modules 51-5*n* are respectively selected by the first hierarchy address selection circuit 22' and activated. The light path of each of the thermal-optical switch modules 51-5*n* is controlled by the second hierarchy address selection signals A1-An and the data signals $P_1$-$P_n$. FIG. 5B is a waveform diagram of signals generated by the multi-dimensional data registration integrated circuit in FIG. 5A. In this embodiment, there are five thermal-optical switch modules.

The above-described embodiments of the present invention are intended to be illustrative only. Those skilled in the art may devise numerous alternative embodiments without departing from the scope of the following claims.

What is claimed is:

1. A multi-dimensional data registration integrated circuit for driving array-arrangement devices, the multi-dimensional data registration integrated circuit comprising a plurality of first hierarchy sets, each first hierarchy set comprising a plurality of second hierarchy sets, each second hierarchy set comprising a plurality of array-arrangement devices, the multi-dimensional data registration integrated circuit further comprising:

a first hierarchy address selection circuit comprising a first serial-in parallel-out circuit having a plurality of parallel outputs for correspondingly selecting the plurality of first hierarchy sets;

a second hierarchy address selection circuit comprising a plurality of second serial-in parallel-out circuits for correspondingly selecting the second hierarchy sets, each second serial-in parallel-out circuit connecting to a corresponding one of the plurality of parallel outputs of the first serial-in parallel-out circuit; and a data supply circuit writing a plurality of data into a designated second hierarchy set according to the scanning sequence of the second hierarchy address selection circuit.

2. The multi-dimensional data registration integrated circuit for driving array-arrangement devices of claim 1, wherein the first hierarchy address selection circuit comprises a level shift register circuit outputting a plurality of first hierarchy address selection signals for selecting the plurality of first hierarchy sets.

3. The multi-dimensional data registration integrated circuit for driving array-arrangement devices of claim 1, wherein the second hierarchy address selection circuit comprises a level shift register circuit outputting a plurality of second hierarchy address selection signals for selecting the plurality of second hierarchy sets.

4. The multi-dimensional data registration integrated circuit for driving array-arrangement devices of claim 1, wherein the array-arrangement devices are a plurality of thermal-optical switches.

5. The multi-dimensional data registration integrated circuit for driving array-arrangement devices of claim 1, wherein the array-arrangement devices are thermal resistors for controlling a plurality of nozzles of a printhead chip.

6. The multi-dimensional data registration integrated circuit for driving array-arrangement devices of claim 1, wherein each of the second hierarchy sets is further divided into a plurality of third hierarchy sets, and the second hierarchy address selection circuit scans the third hierarchy sets for selecting at least one of the third hierarchy sets for activation.

7. The multi-dimensional data registration integrated circuit for driving array-arrangement devices of claim 6, further comprising a third hierarchy address selection circuit outputting a plurality of third hierarchy address selection signals for scanning and selecting the plurality of second hierarchy sets.

8. The multi-dimensional data registration integrated circuit for driving array-arrangement devices of claim 1, wherein the first hierarchy address selection circuit comprises asymmetric MOSFET devices or CMOSFET devices.

9. The multi-dimensional data registration integrated circuit for driving array-arrangement devices of claim 1, wherein the second hierarchy address selection circuit comprises asymmetric MOSFET devices or CMOSFET devices.

10. The multi-dimensional data registration integrated circuit for driving array-arrangement devices of claim 1, wherein the array-arrangement devices are a plurality of printheads.

* * * * *